United States Patent [19]

SanGregory et al.

[11] Patent Number: 5,311,239
[45] Date of Patent: May 10, 1994

[54] CAMERA MECHANISM FOR SETTING FOCUS AND APERTURE

[75] Inventors: Jude A. SanGregory, Spencerport; James R. Kavanaugh, Henrietta; Leonard Richiuso, Rochester, all of N.Y.

[73] Assignee: Eastman Kodak Company, Rochester, N.Y.

[21] Appl. No.: 102,456

[22] Filed: Aug. 4, 1993

[51] Int. Cl.5 .............................. G03B 13/00
[52] U.S. Cl. ................. 354/400; 354/195.11; 354/234.1
[58] Field of Search ............... 354/400, 195.1–195.12, 354/230, 234.1, 235.1

[56] References Cited

U.S. PATENT DOCUMENTS

| 4,426,145 | 1/1984 | Hashimoto | 354/195.1 |
| 4,623,233 | 11/1986 | Yamada et al. | 354/234.1 |
| 4,876,563 | 10/1989 | Ishida et al. | 354/234.1 |
| 4,985,724 | 1/1991 | Akimoto et al. | 354/400 |

Primary Examiner—David M. Gray
Attorney, Agent, or Firm—Roger A. Fields

[57] ABSTRACT

A fast-opening shutter includes an actuating member moveable in a one direction for setting an aperture stop and in the opposite direction for setting focus. The camera shutter is then driven to open against the stop independently of movement of the actuating member. According to more specific features, the actuating member first sets the stop and then focuses a camera optical element. After the exposure is completed, the mechanism is reset by further movement of the actuating member in the second or opposite direction.

10 Claims, 1 Drawing Sheet

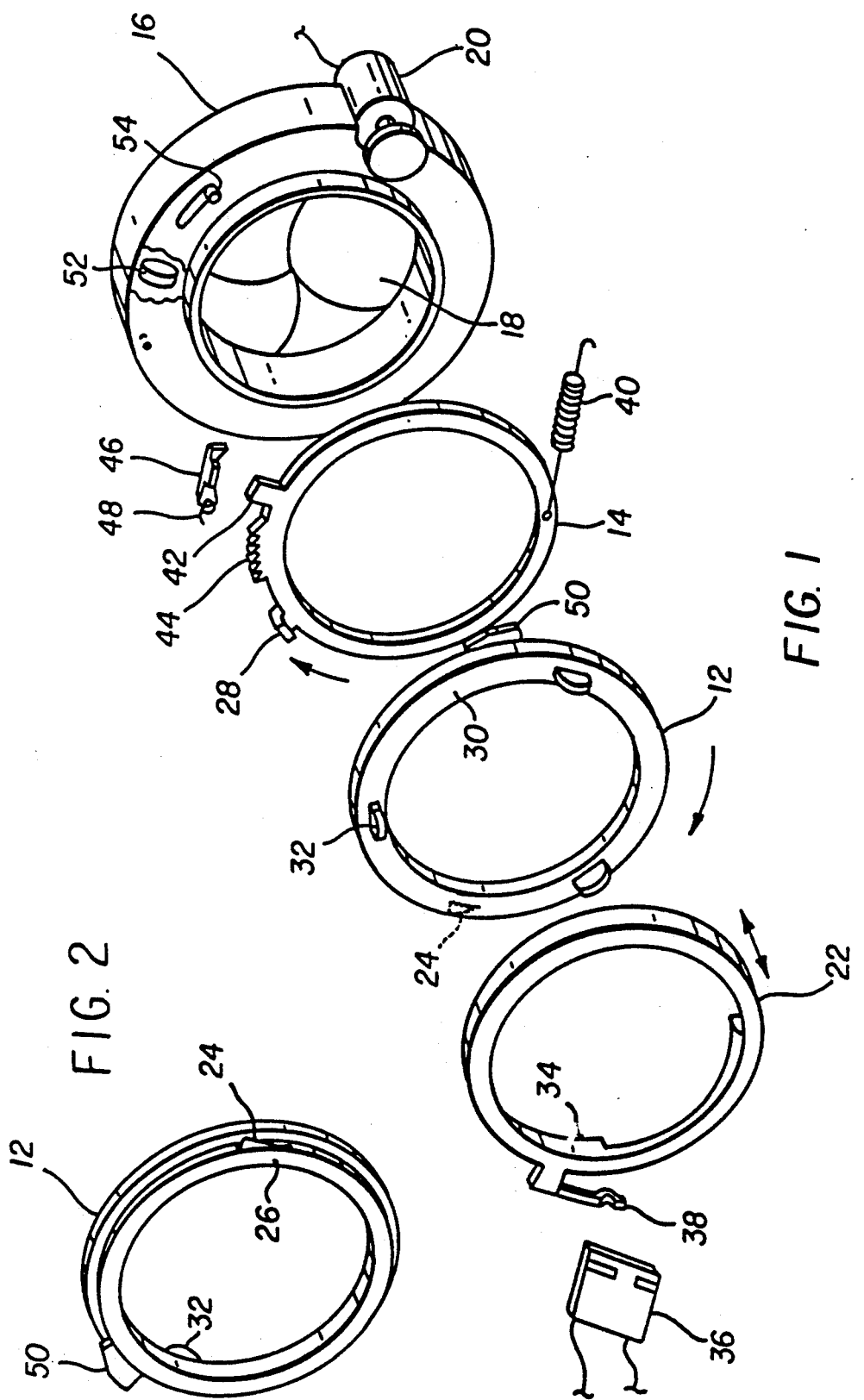

CAMERA MECHANISM FOR SETTING FOCUS AND APERTURE

BACKGROUND OF THE INVENTION

1. Field of Invention

The invention relates to photographic cameras having adjustable exposure and focus settings, and more specifically to a mechanism in such cameras for focusing an optical element and setting a maximum aperture.

2. Description of the Prior Art

Camera mechanisms for adjusting focus and exposure come in many varieties. Those considered most pertinent to the present invention use an actuating member that rotates in a first direction for setting focus and a second opposite direction for controlling exposure. Typically, focus is established first by cams that rotate with the member in the first direction against ramps on an optical element, moving it axially into focus. The focusing components then are held stationary while the shutter is actuated by rotation of the member in the opposite direction. The shutter usually includes blades that move in a timed sequence controlled by movement of the actuating member, and the maximum aperture depends on the time period of the blade opening part of the sequence.

PROBLEM SOLVED BY THE INVENTION

Shutters of the type summarized above are referred to as "slow opening." The maximum aperture is determined by time, and would be difficult to control if the same approach were used in faster shutters. Exposure time and the maximum aperture are interdependent, so errors in one have a direct impact on the other, making exposure control somewhat more sensitive and variable. Environmental factors, such as heat, contaminates and wear, not only slow the shutter, but also reduce the aperture, having a cumulative adverse effect on exposure.

SUMMARY OF THE INVENTION

The present invention is directed to overcoming one or more of the problems set forth above. Briefly summarized, according to one aspect of the invention, a fast-opening shutter includes an actuating member moveable in one direction for setting an aperture stop and an opposite direction for setting focus. The camera shutter is then driven open against the stop independent of the actuator movement.

According to more specific features, the actuating member first sets the stop and then focuses a camera optical element. After the exposure is completed, the mechanism is reset by further movement of the actuating member continuing in the second or opposite direction.

ADVANTAGEOUS EFFECTS OF THE INVENTION

The invention provides a compact mechanism for setting aperture and focus in a camera with a fast-opening shutter that moves independently of the aperture and focus control. The effective aperture is determined by a stop position rather than a timed sequence, so the exposure aperture and exposure time are not both dependent on the same actuating movement.

These and other features and advantages will be more clearly understood and appreciated from a review of the following detailed description of the preferred embodiments and appended claims, and by reference to the accompanying drawings.

BRIEF DESCRIPTION OF THE DRAWINGS

FIG. 1 is an exploded perspective view of a camera mechanism for setting focus and aperture according to the invention.

FIG. 2 is a partial perspective view of a control member showing the member from the opposite side compared to FIG. 1.

DESCRIPTION OF THE PREFERRED EMBODIMENTS

Referring now to the drawings, a camera mechanism is disclosed for setting aperture and focus. The mechanism includes a control member 12, an aperture setting element 14, a shutter 16 including a plurality of blades 18, a stepper motor 20 for driving control member 12, and an optical element 22 for setting focus.

The control member 12 is a ring centered on the optical axis and supported for rotation around the axis in both directions: clockwise (FIG. 1) for setting the aperture, and counter-clockwise for adjusting focus. The control member includes a catch 24 that is pivotal mounted at 26 for movement between an extended position, as shown, and a retracted position. The catch is spring biased toward the extended position where it will engage a hook 28 on the aperture setting element 14 when the control member is rotated clockwise. The catch will pivot temporarily to the retracted position, however, to clear the hook, when the control member is rotated counter-clockwise.

A side of the control member facing the optical element 22 includes an annular surface 30 that carries three cams 32 extending axially toward the optical element. The cams 32 rotate with the control member for engaging three corresponding ramps 34 on the optical element to move the element axially for focusing. The optical element does not rotate, but is mounted to permit the axial movement just described between a starting or retracted position where it is closest to the shutter 16 and an infinite number of focusing positions determined by the rotational position of the control member and the engagement between cams 32 and ramps 32. A switch 36 and contact 38 provide an electrical connection when the optical element is in the starting position.

Aperture setting element 14 is a ring mounted for coaxial rotation with the control member against spring bias 40. The element includes the hook 28, already mentioned, an aperture stop 42, which determines the aperture setting for each exposure, and a plurality of ratchet teeth 44 for locking the aperture setting element in a given position after it is established by clockwise rotation of the control member. A pawl 46 engages the teeth 44 under a spring bias 48 to maintain the locked position, but will pivot to release the element when engaged by a ramped surface on release tab 50 extending from the control member.

The shutter is operated by an electromagnetic actuator 52 separate from stepper motor 20. The blades 18, which form an iris type shutter, pivot to move between a closed light-blocking position and a plurality of open exposure positions. The aperture in the open positions is limited by engagement between the stop 42 on the aperture setting element 14 and a pin 54 carried by or moveable with the shutter blades. The shutter is fast-opening, which means it is driven rapidly open against an aperture stop where it remains for the proper exposure duration. Although the aperture stop is set by the control member, the shutter is driven open and is closed independent of movement of the control member. Similarly, the effective aperture is independent of exposure duration.

Referring now to the operation of the mechanism, stepper motor 20 is energized to rotate the control member 12 in a first direction, clockwise in FIG. 1. Catch 24 on the control member 12 engages hook 28 on the aperture setting element 14 and rotates the element with the control member. Rotation continues in this same direction for a controlled distance or angle of rotation to position aperture stop 42 where it will be engaged by pin 54 to establish the desired maximum exposure aperture. The aperture setting components of the mechanism are then locked in position by engagement between pawl 46 and teeth 44 on element 14. The stepper motor is electrically reversed to rotate the control member in a second opposite direction, counter-clockwise in FIG. 1. The cams 32 on the control member engage the ramps 34 on the optical element and move the element axially to focus the camera. When the proper focus is attained, the shutter is actuated by electromagnetic actuator 52 to drive the shutter blades open to a maximum aperture determined by stop 42. The blades remain open for the desired exposure duration, and then are released to close and complete the exposure cycle.

After the exposure, stepper motor 20 continues to rotate the control member counter-clockwise. Release tab 50 engages pawl 46 and lifts it out of engagement with teeth 44, releasing the focusing element 14 to return to its initial position under the influence of spring bias 40. Catch 24 collapses and passes under hook 28, and the optical element returns to its starting position. Contact 38 engages switch 36, and stepper motor 20 is stopped ready for the next exposure sequence.

While the invention has been described with particular reference to a preferred embodiment, it is intended that the claims shall cover other modifications and applications that do not depart from the true spirit and scope of the invention.

PARTS LIST FOR FIGURES

| Reference No. | Part |
| --- | --- |
| 12 | Control Member. |
| 14 | Aperture setting element. |
| 16 | Shutter. |
| 18 | Shutter blades. |
| 20 | Stepper motor. |
| 22 | Optical element. |
| 24 | Catch. |
| 26 | Pivot. |
| 28 | Hook. |
| 30 | Annular surface. |
| 32 | Cams. |
| 34 | Ramps. |
| 36 | Switch. |
| 38 | Electrical contact. |
| 40 | Spring. |
| 42 | Aperture stop. |
| 44 | Ratchet teeth. |

-continued

PARTS LIST FOR FIGURES

| Reference No. | Part |
| --- | --- |
| 46 | Pawl. |
| 48 | Spring. |
| 50 | Release tab. |
| 52 | Electromagnetic actuator. |
| 54 | Pin. |

What is claimed is:

1. A camera mechanism including an actuating member moveable in a one direction for focusing an optical element and an opposite direction for controlling a shutter aperture according to a desired exposure value; characterized in that:

said actuating member sets a stop for limiting shutter movement to a maximum aperture; and, said shutter is driven to open to said maximum aperture determined by said stop.

2. A camera mechanism according to claim 1, wherein said actuating member first sets said stop and then focuses said optical element.

3. A camera mechanism according to claim 1, including means for driving said shutter to open rapidly to a maximum aperture determined by said stop.

4. A camera mechanism according to claim 3, including means for driving said actuating member in said one and opposite directions independently of said shutter driving means.

5. A camera mechanism including an actuating member rotateable in one direction for adjusting camera focus and rotateable in an opposite direction for controlling a shutter aperture; characterized in that:

said actuating member controls said shutter aperture by setting a maximum aperture stop; and, said shutter is driven to open against said stop independently of movement of said actuating member.

6. A camera mechanism according to claim 5, wherein said actuating member first sets said stop and then focuses said optical element.

7. A camera mechanism for setting the maximum aperture of a shutter and the focus of an optical element, said mechanism comprising:

an actuating member;

means for rotating said actuating member in a first direction for setting a stop that limits the maximum aperture of the shutter, and for rotating said actuating member in a second direction opposite said first direction for setting the focus of the optical element.

8. A camera mechanism according to claim 7, wherein the shutter has a closed position and an open position determined by said stop, and including:

means for driving said shutter from said closed position to said open position, said shutter driving means being operable independently of movement of said actuating member.

9. A camera mechanism according to claim 8, wherein said actuating member first sets said stop and then focuses said optical element.

10. A camera mechanism according to claim 8, wherein said stop is set according to a desired exposure, and said shutter driving means opens said shutter rapidly against said stop independent of exposure duration.

* * * * *